(12) United States Patent
Liao

(10) Patent No.: US 11,650,459 B2
(45) Date of Patent: May 16, 2023

(54) SPATIAL LIGHT MODULATOR FOR SUPPRESSING FRINGE FIELD EFFECT

(71) Applicant: Cheng-Hsing Liao, Zhubei (TW)

(72) Inventor: Cheng-Hsing Liao, Zhubei (TW)

(*) Notice: Subject to any disclaimer, the term of this patent is extended or adjusted under 35 U.S.C. 154(b) by 0 days.

(21) Appl. No.: 17/455,602

(22) Filed: Nov. 18, 2021

(65) Prior Publication Data

US 2022/0155643 A1 May 19, 2022

(30) Foreign Application Priority Data

Nov. 18, 2020 (TW) .................. 109140379
Mar. 12, 2021 (TW) .................. 110108864

(51) Int. Cl.
G02F 1/1337 (2006.01)
G02F 1/1343 (2006.01)
G02F 1/1335 (2006.01)

(52) U.S. Cl.
CPC .. *G02F 1/133753* (2013.01); *G02F 1/133553* (2013.01); *G02F 1/133749* (2021.01); *G02F 1/133757* (2021.01); *G02F 1/134309* (2013.01)

(58) Field of Classification Search
None
See application file for complete search history.

(56) References Cited

U.S. PATENT DOCUMENTS

2018/0164643 A1* 6/2018 Liao ................ G02F 1/133753
2020/0160772 A1 5/2020 Hu et al.
2020/0333662 A1* 10/2020 Hu ..................... G09G 3/2077

* cited by examiner

Primary Examiner — Phu Vu
(74) Attorney, Agent, or Firm — Muncy, Geissler, Olds & Lowe, P.C.

(57) ABSTRACT

A spatial light modulator for suppressing a fringe field effect includes: a transparent electrode layer; a reflective electrode layer including a pixel electrode, in which a pixel area is surrounded by a boundary of the pixel electrode; a liquid crystal layer located between the transparent electrode layer and the reflective electrode layer to establish a pixel formed by the liquid crystal layer covering the pixel area in the pixel electrode; and an alignment film having a first pattern and a second pattern and covering the pixel area. The first pattern and the second pattern in the pixel area make liquid crystals in the liquid crystal layer of the pixel generate arrangements of a first azimuth angle and a second azimuth angle, respectively, and the first azimuth angle is different from the second azimuth angle.

6 Claims, 6 Drawing Sheets

SPATIAL LIGHT MODULATOR FOR SUPPRESSING FRINGE FIELD EFFECT

CROSS-REFERENCE TO RELATED APPLICATIONS

This application claims priorities of Nos. 109140379 and 110108864 respectively filed in Taiwan R.O.C. on Nov. 18, 2020 and 12 Mar. 2021 under 35 USC 119, the entire contents of which are hereby incorporated by reference.

BACKGROUND OF THE INVENTION

Field of the Invention

This disclosure relates to a spatial light modulator (SLM), and more particularly to a SLM using a pattern of an alignment film to suppress a fringe field effect (FFE).

Description of the Related Art

The FFE is that an electric field generated at a boundary of a pixel electrode leaks to a neighboring pixel, affecting the liquid crystal (LC) alignment at the neighboring pixel and thereby generating unwanted phase shifts to the light incident on the neighboring pixel. The phase shifts are different at different places on the neighboring pixel, and are most pronounced around the boundary of the neighboring pixel. The presence of FFE can significantly deteriorate the SLM performance, such as a considerable reduction of diffraction efficiency and phase profile accuracy.

BRIEF SUMMARY OF THE INVENTION

An objective of this disclosure is to provide a spatial light modulator using a pattern on an alignment film to make a LC layer present an uneven distribution on a pixel electrode to suppress the FFE.

Another objective of this disclosure is to provide a spatial light modulator using the pattern on the alignment film to make the LC of each pixel in the LC layer have at least two different azimuth angles.

This disclosure discloses a spatial light modulator (SLM) for suppressing a fringe field effect. The SLM includes: a transparent electrode layer; a reflective electrode layer including a pixel electrode, in which a pixel area is surrounded by a boundary of the pixel electrode; a liquid crystal layer located between the transparent electrode layer and the reflective electrode layer to establish a pixel formed by the liquid crystal layer covering the pixel area in the pixel electrode; and an alignment film having a first pattern and a second pattern and covering the pixel area. The first pattern and the second pattern in the pixel area make liquid crystals in the liquid crystal layer of the pixel generate arrangements of a first azimuth angle and a second azimuth angle, respectively, and the first azimuth angle is different from the second azimuth angle.

In the SLM for suppressing the FFE in one embodiment of this disclosure, the first azimuth angle is larger than the second azimuth angle.

In the SLM for suppressing the FFE in one embodiment of this disclosure, if the liquid crystal layer is regarded as being parallel to an X-Y plane, then an included angle between an X-axis and each of the liquid crystals in the liquid crystal layer of a first area on the X-Y plane is the first azimuth angle, and the first azimuth angle is greater than 0 degrees and smaller than or equal to 5 degrees.

In the SLM for suppressing the FFE in one embodiment of this disclosure, the second azimuth angle in a second area is equal to 0 degrees.

In the SLM for suppressing the FFE in one embodiment of this disclosure, an included angle between a Z-axis and each of the first azimuth angle and the second azimuth angle is equal to 90 degrees.

DETAILED DESCRIPTION OF THE INVENTION

Figure 1:
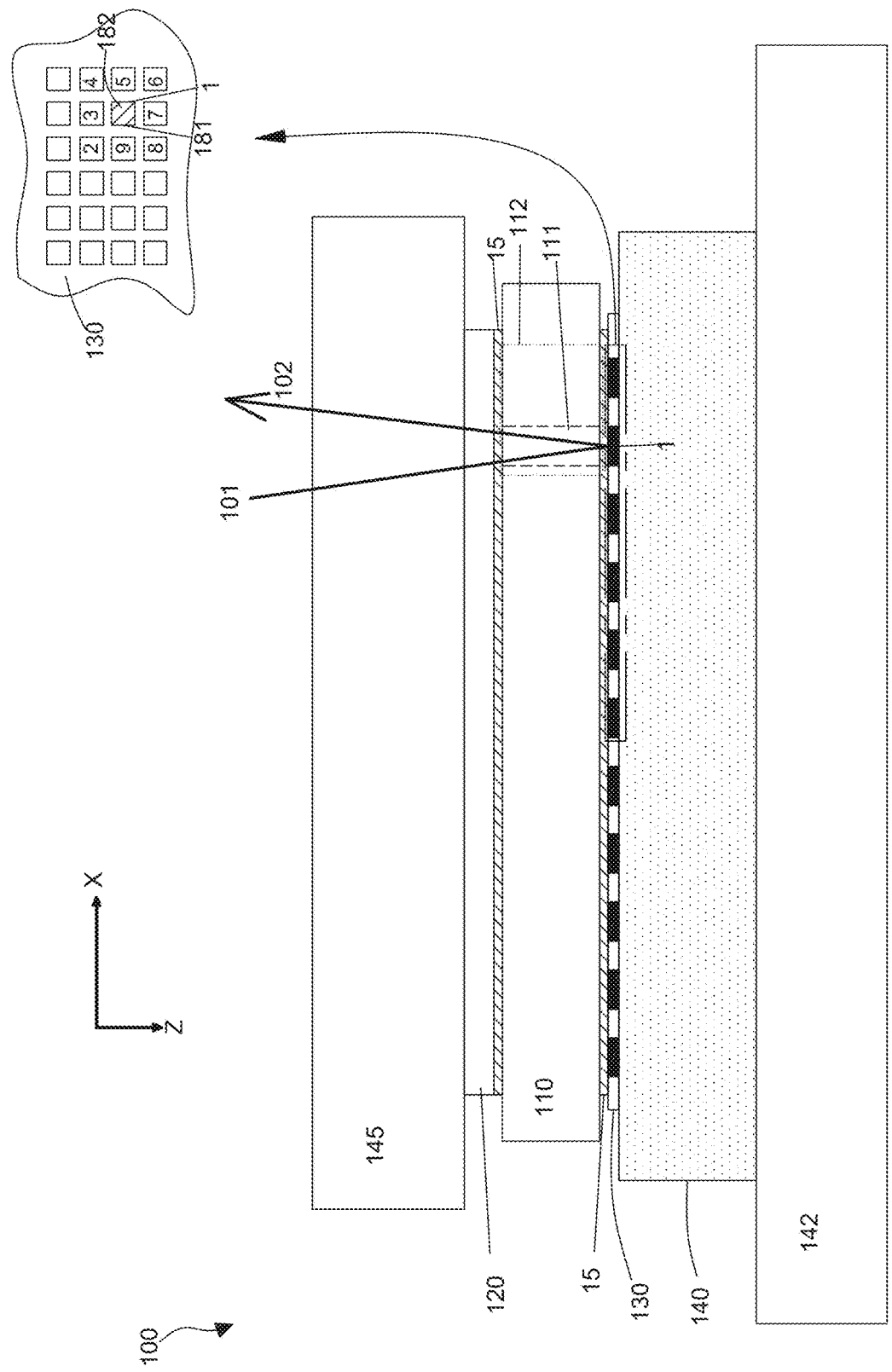
FIG. 1 is a schematic view showing an embodiment of this disclosure.

FIG. 1 is a schematic view showing a spatial light modulator (SLM) 100 of an embodiment of this disclosure. Referring to FIG. 1, the SLM 100 includes a transparent electrode layer 120, a reflective electrode layer 130, and a liquid crystal (LC) layer 110 and an alignment film 15 located between the transparent electrode layer 120 and the reflective electrode layer 130.

Please note that the reflective electrode layer 130 includes multiple pixel electrodes (e.g., pixel electrodes 1 to 9) being arranged in an array and forming multiple pixels. Each pixel includes one pixel electrode and a portion of the LC layer 110 thereabove. A pixel area 182 in the pixel electrodes 1 to 9 is surrounded by a boundary 181 of the pixel electrode.

The LC layer 110 is located between the transparent electrode layer 120 and the reflective electrode layer 130 to establish one pixel. The pixel is formed by the LC layer 110 covering the pixel area 182 of the pixel electrode.

The alignment film 15 has a first pattern and a second pattern and covers the pixel area. The first pattern and the second pattern of the pixel area 182 make liquid crystals in the LC layer 110 of the pixel in the pixel area 182 generate arrangements of a first azimuth angle and a second azimuth angle, respectively, and the first azimuth angle is different from the second azimuth angle.

In one embodiment, the reflective electrode layer 130 is formed on a substrate 140, so that the SLM 100 is a liquid crystal on silicon (LCoS) (or monocrystalline silicon reflective liquid crystal) SLM. A rigid slab 142, such as a ceramic substrate or a metal slug, may be used to mechanically support the substrate 140 and the components thereon. A glass slab 145 is installed on the transparent electrode layer 120 to offer the mechanical protection thereto while allowing light to travel through to reach the LC layer 110 if the SLM 100 is intended to modulate visible light.

The indium tin oxide (ITO) can be used to form the transparent electrode layer 120. In most practical realizations, the LC layer 110 is homogeneous (with LC molecules therein aligned in a direction parallel to the transparent electrode layer 120), homeotropical (with the LC molecules aligned in a direction perpendicular to the transparent electrode layer 120) or twisted (with the LC molecules aligned in a helix-like structure).

One aspect of this disclosure is to provide a SLM for modulating incident light, wherein the LC layer of the SLM is configured to make the azimuth angles of the pixel electrodes have the uneven distribution (i.e., the alignment film 15 has two different pattern areas), so that the difference of the azimuth angle is present between the corresponding areas to suppress the FFE, and the shapes of the pixel electrodes need not to be changed. For example, if rectangular pixel electrodes are used in the initial design, the similar rectangular pixel electrodes still can be used after this disclosure has been applied to the initial design.

FIG. 1 depicts the structure of one exemplary SLM 100 of this disclosure. The SLM 100 includes a transparent electrode layer 120, a reflective electrode layer 130, and a LC layer 110 located between the transparent electrode layer 120 and the reflective electrode layer 130. The reflective electrode layer 130 includes multiple pixel electrodes (include pixel electrodes 1 to 9) arranged in an array to form multiple pixels. Each pixel includes one pixel electrode and a portion of the LC layer 110 thereon. In one embodiment, the reflective electrode layer 130 is formed on the substrate 140, so that the SLM 100 is a LCoS SLM. A rigid slab 142, such as a ceramic substrate or a metal slug, may be used to mechanically support the substrate 140 and the components thereon. Preferably, a glass slab 145 is installed on the transparent electrode layer 120 to offer the mechanical protection thereto while allowing light to travel through to reach the LC layer 110 if the SLM 100 is intended to modulate visible light. It is known to those skilled in the art that the indium tin oxide (ITO) can be used to form the transparent electrode layer 120. In most practical realizations, the LC layer 110 is homogeneous (with LC molecules therein aligned in a direction parallel to the transparent electrode layer 120), homeotropical (with the LC molecules aligned in a direction perpendicular to the transparent electrode layer 120) or twisted (with the LC molecules aligned in a helix-like structure).

For conciseness, the following description will be made by taking the pixel electrodes 1 to 9 functioning as representative pixel electrodes. The pixel electrode 1 has one pixel area 182 surrounded by the boundary 181 of the pixel electrode 1. A pixel 111 is formed on the pixel electrode 1, and is the LC layer 110 covering the pixel area 182. Because the pixel 111 is located on the pixel area 182, the pixel boundary of the pixel 111 is also the boundary 181. An enlarged pixel 112 including the pixel 111 and one adjacent pixel is also defined. When an incident light ray 101 enters the pixels 111 and 112, the incident light ray 101 experiences an optical phase retardation with an amount depending on a voltage difference between the pixel electrode 1, 5 (or 3, 7, and 9) and the transparent electrode layer 120. When the incident light ray 101 reaches the pixel electrode 1, 5 (or 3, 7, and 9), the incident light ray 101 is reflected or diffracted to form a reflected or diffraction light ray 102. During traveling through the LC layer 110 again, the reflected or diffraction light ray 102 further experiences an additional phase retardation substantially close to the aforesaid amount. In total, a phase retardation close to two times of the aforesaid amount is provided.

The pixel 111 has neighboring pixels immediately adjacent to the pixel 111, where these neighboring pixels are formed as portions of the LC layer 110 on the pixel electrodes 2 to 9. When any one of the pixel electrodes 2 to 9 is applied with a voltage different from another voltage applied to the pixel electrode 1, a FFE that negatively affects the pixel 111 results. Consequently, the phase retardation produced by the pixel 111 becomes non-uniform over the pixel area 182, so that the pixel 111 has a two-dimensional uneven distribution of phase retardation.

Figure 2:
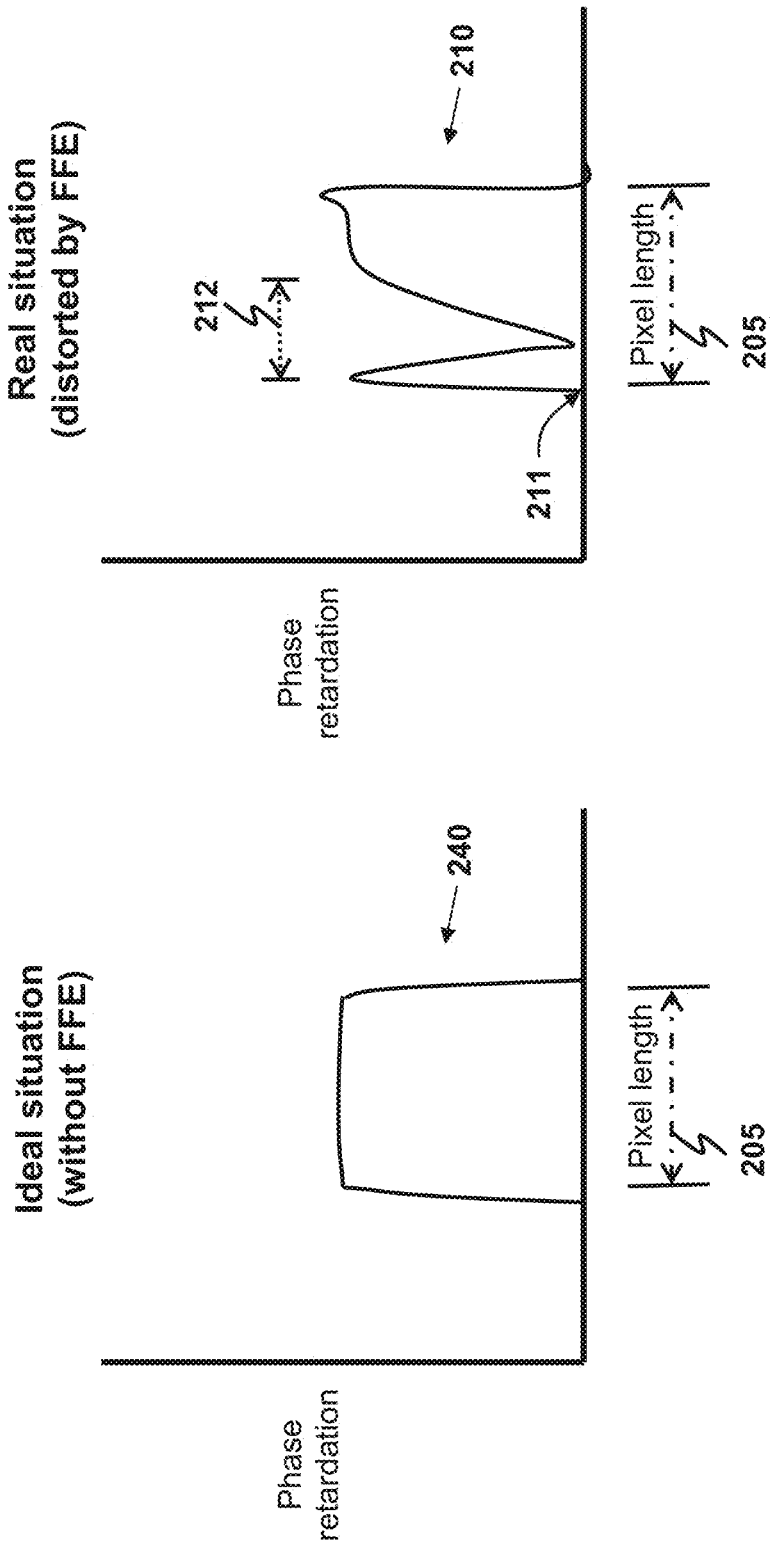
FIG. 2 depicts a typical distribution of a phase retardation under the influence of a FFE, and an ideal phase retardation distribution without the influence of the FFE.

FIG. 2 depicts a one-dimensional typical distribution 210 of a phase retardation along a pixel length 205 under the influence of a FFE, and an ideal phase retardation distribution 240 without the influence of the FFE. When the typical distribution 210 is compared to the ideal phase retardation distribution 240, it is obtained that the FFE causes a great fluctuation in the phase retardation over a certain affected portion 212 of the pixel length 205 near a pixel boundary 211.

The Inventor has found that the phase-retardation fluctuation can be substantially reduced by micro-manipulating "a FFE-opposing feature" over the affected portion 212 to oppose the FFE. The FFE-opposing feature is a tunable property of the LC layer 110. As identified by the Inventor, a usable set of FFE-opposing features includes an azimuth angle. The azimuth angle relates to the arrangement density and the arrangement strength of the liquid crystals, which correspondingly determine the ability of LC against the FFE.

According to this disclosure, at least one of the pixels in the LC layer 110 is realized as an optimized pixel, which is a pixel specifically configured to oppose the FFE based on micro-manipulating one selected FFE-opposing feature. Most preferably, each of the pixels in the LC layer 110 is realized as the optimized pixel. In the following description, the pixel 111 on the pixel electrode 1 is taken as an exemplary pixel realized as the optimized pixel. An uneven distribution (i.e. a non-uniform distribution) of the FFE-opposing features on the pixel area 182 is selected or determined to oppose the FFE induced by the neighboring pixels resided on the pixel electrodes 2 to 9.

Because the FFE mainly affects the pixel boundary 181 of the pixel 111, simplifications can be further made. The affected portion 212 of the pixel 111 is an outer area of the pixel 111, where the outer area represents the pixel boundary 181 and an area extending inwards from the boundary 181 by a certain distance, which can be estimated through computation or computer simulation.

Figure 3:
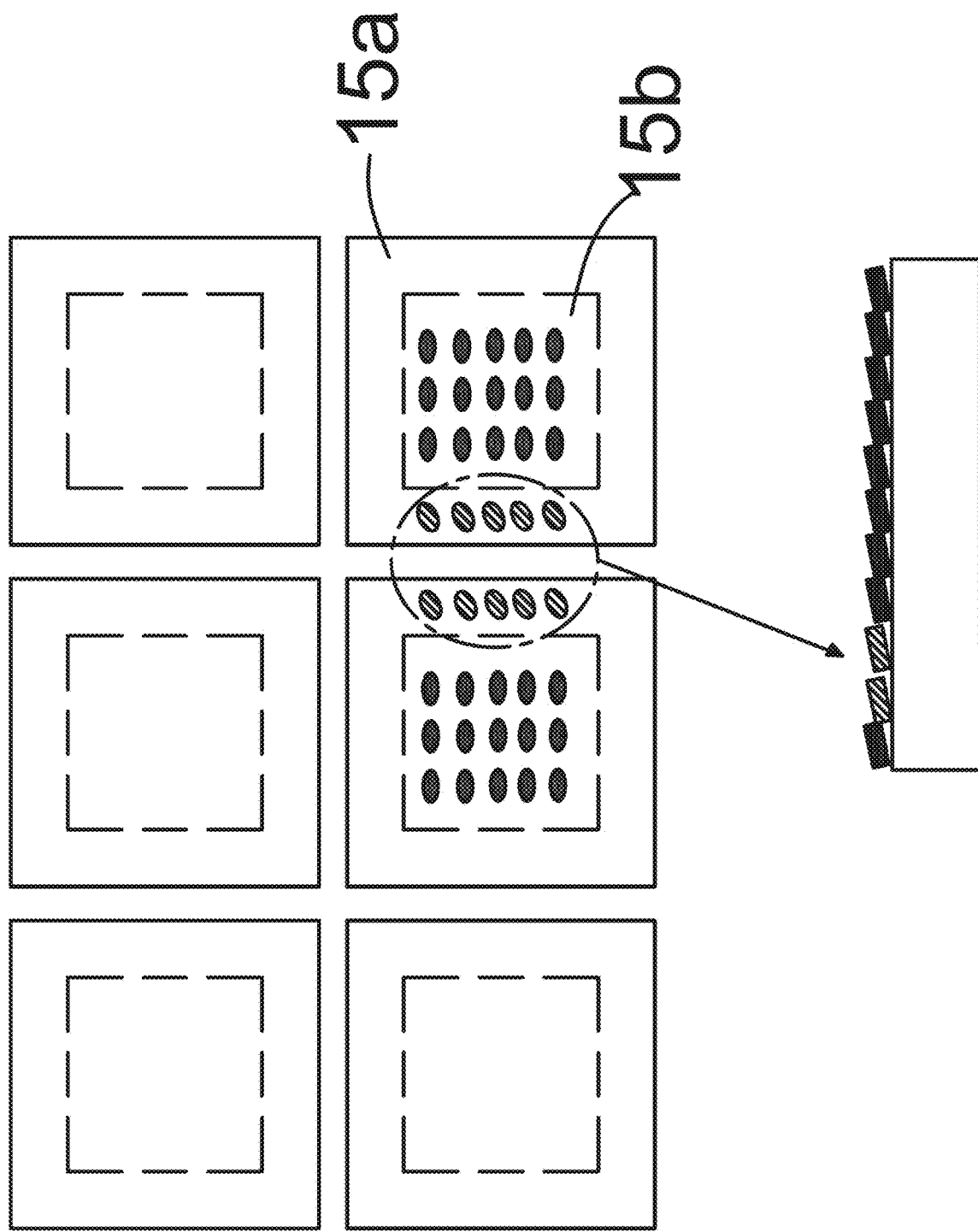
FIG. 3 is a schematic transversal cross-section view showing the FFE after the azimuth angle correction.

FIG. 3 is a schematic transversal cross-section view showing the FFE after the azimuth angle correction. Referring to FIG. 3, each square solid frame represents one pixel area, and the pixel area of each pixel has a first area 15a and a second area 15b (square dashed frame), wherein the first area 15a is the position of the first pattern, the top view of the first area in this embodiment is a square ring, the first area 15a surrounds the second area 15b, the second area 15b is a square area filled up an inside of the square ring, and the width of the square ring is greater than or equal to the range of the FFE of the pixel.

Figure 4:
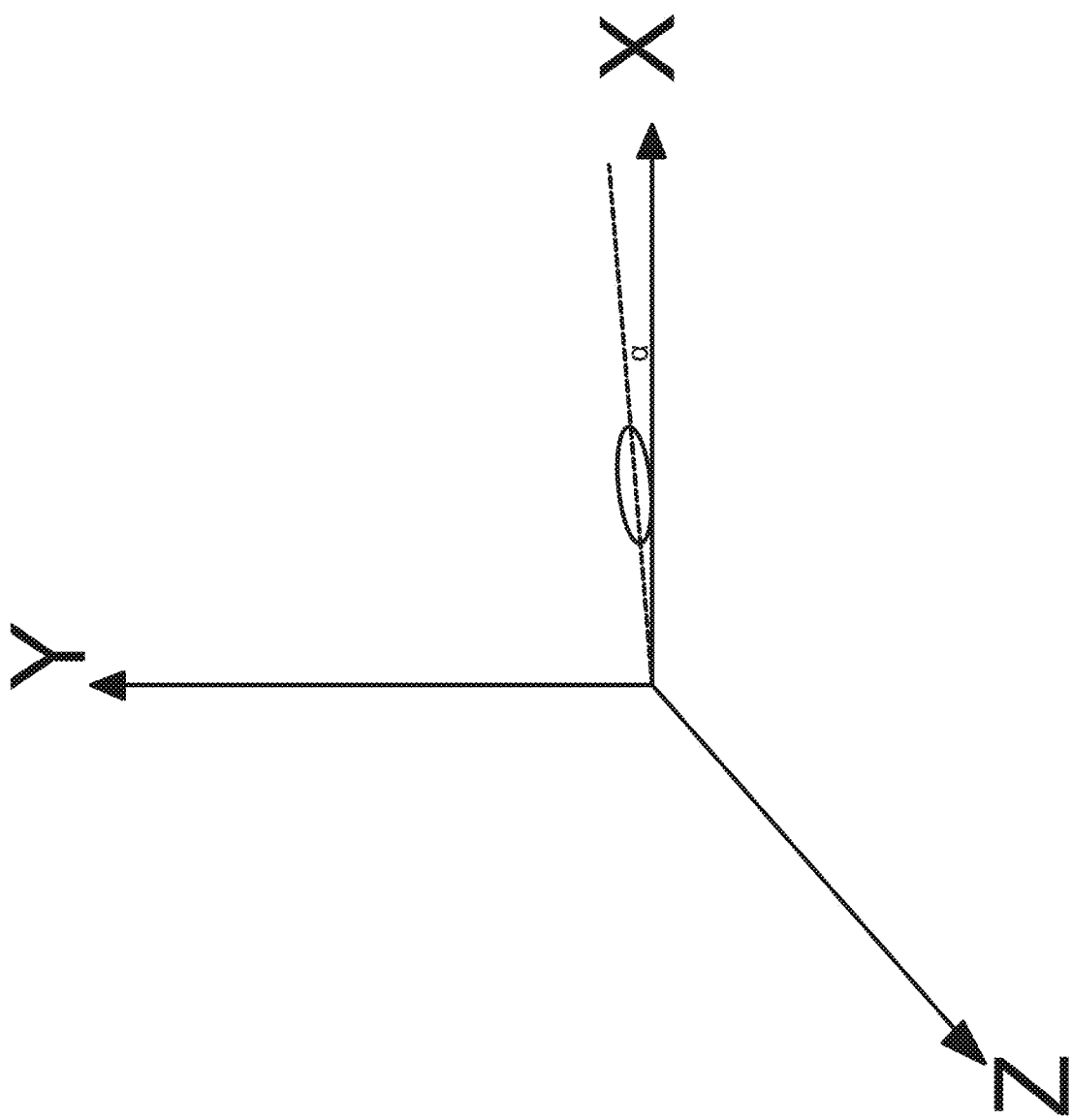
FIG. 4 is a schematic view showing a liquid crystal located in a three-dimensional coordinate system.

FIG. 4 is a schematic view showing a liquid crystal located in a three-dimensional coordinate system. Referring to FIGS. 1, 3 and 4, if the liquid crystal layer is regarded as being parallel to an X-Y plane, then an included angle between the X-axis and each of the liquid crystals of the liquid crystal layer of the first area 15a on the X-Y plane is the first azimuth angle $\alpha$ greater than 0 degrees and smaller than or equal to 5 degrees.

In one embodiment, as mentioned hereinabove, the second azimuth angle $\beta$ (not shown) in the second area 15b is equal to 0 degrees, and the included angle between the Z-axis and each of the first azimuth angle $\alpha$ and the second azimuth angle β is equal to 90 degrees. That is, the first area 15*a* and the second area 15*b* are located on the X-Y plane.

Figure 5:
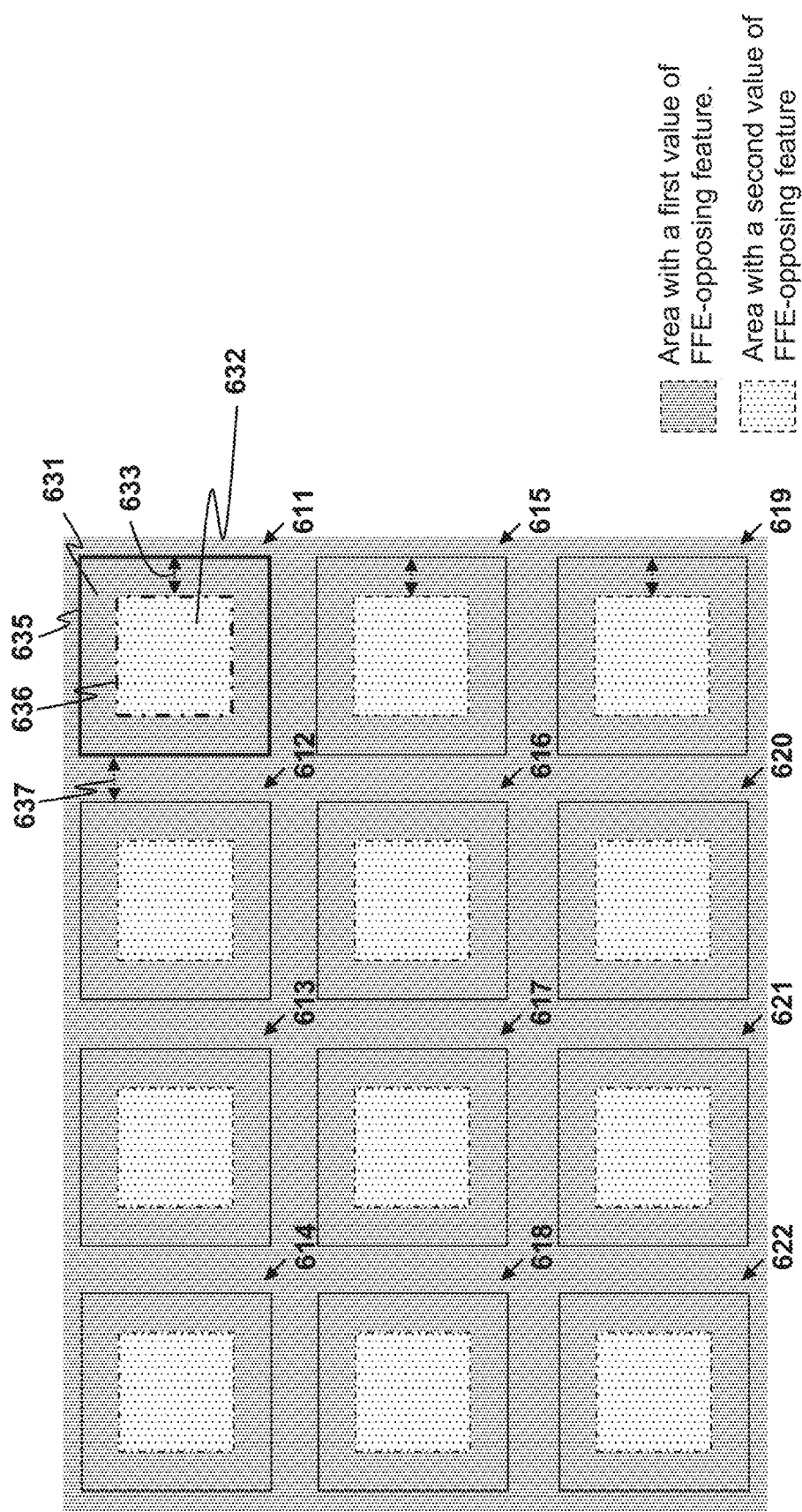
FIG. 5 is a schematic view showing an uneven distribution of FFE-opposing features.

The pixel areas of each pixel have two different patterns forming two different azimuth angles α and β. In other words, the liquid crystals of each pixel area form the uneven distribution of the square ring to oppose the FFE. FIG. 5 functions as an embodiment describing the FFE-opposing feature of the uneven distribution of 12 optimum pixels 611 to 622. In the following description, the optimum pixel 611 functions as a representative optimum pixel. The pixel 611 has a pixel boundary 635. An outer area 631 of the pixel 611 is an area between the pixel boundary 635 and a phantom line 636. The phantom line 636 is located on the optimum pixel 611, and distant from the pixel boundary 635 by a distance 633. The distance 633 is determined such that the outer area 631 is an affected portion (i.e., the affected portion 212). An inner area 632 is an area surrounded by the phantom line 636. The pixel 611 is configured such that the outer area 631 has a first value of FFE-opposing feature, and the inner area 632 has a second value of FFE-opposing feature. Please note that the pixels 611 to 622 are formed on one continuous LC layer (e.g., the LC layer 110). An interpixel gap is formed between two neighboring pixels. For example, a gap 637 is formed between two pixels 611 and 612. Actually, the LC layer on the gap 637 may be configured to have the first value of FFE-opposing feature. Thus, the discontinuity of the FFE-opposing feature along the pixel boundary 635 can be avoided.

Figure 6:
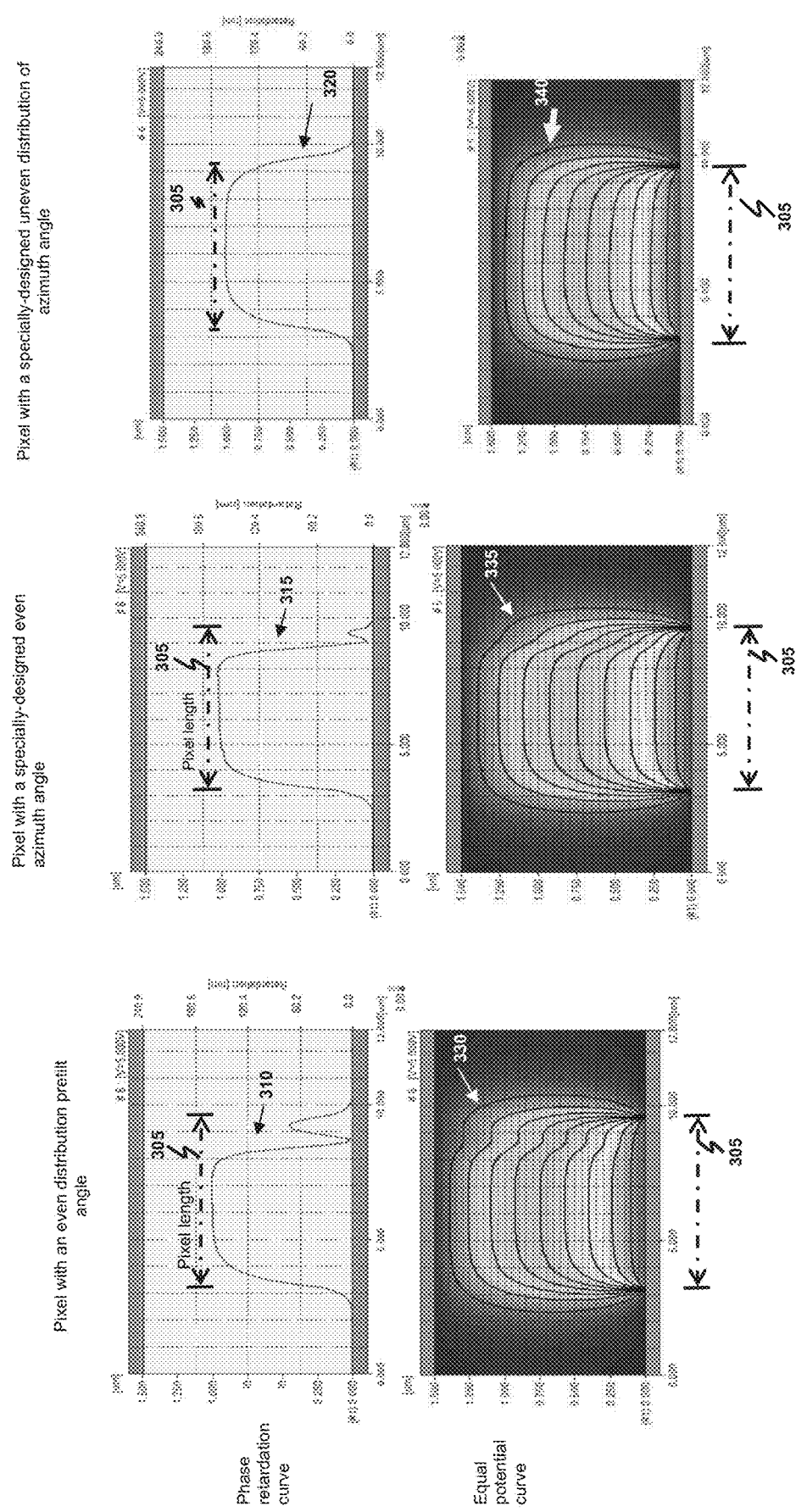
FIG. 6 depicts that the FFE is effectively opposed by the uneven distribution of the azimuth angles.

FIG. 6 depicts that the FFE is effectively opposed by the uneven distribution of the azimuth angles. Referring to FIG. 6, a case using an uneven distribution of azimuth angles and a reference case using an even distribution are depicted on each of phase retardation curves 310, 315 and 320 and each of equal potential curves 330, 335 and 340 over a pixel length 305. The computer analogy is used to obtain the curves 310, 315, 320, 330, 335 and 340 under the following conditions: the pixel length is equal to 6.2 μm; the interpixel gap is equal to 0.2 μm; the voltage difference between two neighboring pixels in the worst case is equal to 5V; a pretilt angle of the pixel on the outer area is equal to 85°, and the outer area ranges between the pixel boundary and a boundary distant therefrom by 1 μm; and another pretilt angle on the remaining portion of the pixel is equal to 88°. It is apparent that, over the pixel length 305, the flat region of the phase retardation curve 320 corresponding to the uneven distribution of azimuth angles is longer than the flat regions corresponding to the phase retardation curves 310 and 315 corresponding to the even distribution case. Similar conclusion is also obtained when examining the equal potential curves 330, 335 and 340. The effectiveness of using the uneven distribution of azimuth angles is demonstrated.

In one embodiment, a nanostructured alignment layer (not shown) may be added onto the alignment film 15 to modify the azimuth angle so that the liquid crystals have the uneven distribution of azimuth angles. The nanostructured alignment layer is patterned to form nanostructures on the alignment film 15 thereof, and the nanostructures have the sizes and shapes for realizing the first pattern and the second pattern, so that the liquid crystals in the pixel area have the uneven distribution of azimuth angles. That is, pattern transfer printing of the nanostructured alignment layer is directly performed by way of nanoimprinting using a motherboard, thereby causing the surface to have the uneven microgroove structures and thus controlling arrangements of liquid crystal molecules.

FIG. 3 is a schematic transversal cross-section view showing the FFE after the azimuth angle correction, where the difference between the azimuth angles of the liquid crystal molecules are enlarged. Based on the optical alignment process, the pretilt angle and anchoring energy method cannot provide the precise control. Correspondingly, based on the optical alignment process, the azimuth-angle method can be easily controlled to be more precise in the production process. In addition, using the azimuth-angle method can reduce and completely suppress crosstalk of the FFE.

In one embodiment, the alignment film includes a LC material and a polymerized material formed by polymerization of a monomer for stabilizing the LC material. The polymerized material is formed by the monomer having an uneven distribution of polymerization degrees over the pixel area. Regarding the alignment film, a light beam having an intensity without a gradient change is used to irradiate the monomer to form the first pattern and the second pattern, so that the liquid crystal layer has two different azimuth angles in the first area 15*a* and the second area 15*b*. That is, the optical alignment uses the polarized ultraviolet light (UV) to irradiate polymer having the photosensitive base in a specific direction, so that the breakdown and rearrangement of molecular chains are generated to cause the microgrooves or polymer backbones on the surface of the alignment film to have the isotropic distribution and thus to control the arrangement of the liquid crystal molecules.

Please note that if the alignment film 15 of this disclosure is formed using the optical alignment method, then a light beam having an intensity without a gradient change is used to irradiate a monomer to successively form the first pattern and the second pattern of the alignment film 15, so that the liquid crystal layer has the first azimuth angle and the second azimuth angle to achieve the uneven distribution of azimuth angles.

In summary, the alignment film of this disclosure has different areas corresponding to different patterns, the liquid crystals in the area where the FFE is located have a specific azimuth angle to achieve the objective of suppressing the FFE.

What is claimed is:

1. A spatial light modulator (SLM) for suppressing a fringe field effect (FFE), the SLM comprising:
   a transparent electrode layer;
   a reflective electrode layer including a pixel electrode, in which a pixel area is surrounded by a boundary of the pixel electrode;
   a liquid crystal layer located between the transparent electrode layer and the reflective electrode layer to establish a pixel formed by the liquid crystal layer covering the pixel area in the pixel electrode; and
   an alignment film having a first pattern and a second pattern and covering the pixel area, wherein the first pattern and the second pattern in the pixel area make liquid crystals in the liquid crystal layer of the pixel generate arrangements of a first azimuth angle and a second azimuth angle, respectively, and the first azimuth angle is different from the second azimuth angle;
   wherein, the plane where the liquid crystal layer located is the X-Y plane, and the first azimuth angle and the second azimuth angle are the angles between the X-Y plane and the X axis; the pixel area of the pixel has a first area and a second area, the first pattern is disposed in the first area, the second pattern is disposed in the second area, and the first pattern surrounds the second pattern; the first azimuth angle is larger than the second azimuth angle; and the first azimuth angle is greater than 0 degrees and smaller than or equal to 5 degrees.

2. The SLM according to claim 1, wherein the liquid crystal layer is homogeneous or homeotropical or twisted.

3. The SLM according to claim 2, wherein the alignment film is irradiated by a light beam having an intensity without a gradient change to successively form the first pattern and the second pattern to achieve the liquid crystal layer having an uneven distribution of the first azimuth angle and the second azimuth angle.

4. The SLM according to claim 1, wherein the first area is a square ring, the first area surrounds the second area, and the second area is a square area filled up an inside of the square ring.

5. The SLM according to claim 4, wherein a width of the square ring is greater than or equal to a range of the FFE of the pixel.

6. The SLM according to claim 2, further comprising:
   a nanostructured alignment layer patterned to form nanostructures on the alignment film thereof, sizes and shapes of the nanostructures being determined for realizing the first pattern and the second pattern, so that the liquid crystals in the pixel area have an uneven distribution of azimuth angles.

* * * * *